United States Patent
Chen et al.

(10) Patent No.: US 7,167,220 B2
(45) Date of Patent: Jan. 23, 2007

(54) SURFACE LIGHT SOURCE AND LIGHT GUIDE PLATE HAVING COLOR FILTER

(75) Inventors: Ga-lane Chen, Fremont, CA (US); Charles Leu, Fremont, CA (US)

(73) Assignee: Hon Hai Precision Ind. Co., Ltd, Taipei Hsien (TW)

( * ) Notice: Subject to any disclaimer, the term of this patent is extended or adjusted under 35 U.S.C. 154(b) by 106 days.

(21) Appl. No.: 10/750,024

(22) Filed: Dec. 31, 2003

(65) Prior Publication Data

US 2004/0155996 A1 Aug. 12, 2004

(30) Foreign Application Priority Data

Dec. 31, 2002 (TW) .............................. 91137947 A

(51) Int. Cl.
*G02F 1/1335* (2006.01)

(52) U.S. Cl. ......................................... 349/65; 349/106

(58) Field of Classification Search ............ 349/61–62, 349/70, 68, 65; 362/617–618, 615
See application file for complete search history.

(56) References Cited

U.S. PATENT DOCUMENTS

| | | | | |
|---|---|---|---|---|
| 4,924,356 A | * | 5/1990 | French et al. ................ | 362/607 |
| 5,211,463 A | * | 5/1993 | Kalmanash ................... | 362/26 |
| 6,104,446 A | * | 8/2000 | Blankenbecler et al. ....... | 349/5 |
| 6,649,952 B2 | | 11/2003 | Sawada | |
| 2005/0046321 A1 | * | 3/2005 | Suga et al. .................. | 313/112 |

* cited by examiner

*Primary Examiner*—James A. Dudek
(74) *Attorney, Agent, or Firm*—Wei Te Chung

(57) ABSTRACT

A surface light source (30) has a light source (23), and a light guide plate (20) for introducing light beams from the light source out. The light guide plate includes an incident surface (211) for introducing light beams in; an emitting surface (214) for uniformly transmitting light beams out; and a bottom surface (212) opposite to the emitting surface for reflecting the light beams in directions toward the emitting surface. Furthermore, a color filter (22) is provided and disposed on the emitting surface of the light guide plate, which has a color layer (222) for a full color display.

18 Claims, 3 Drawing Sheets

SURFACE LIGHT SOURCE AND LIGHT GUIDE PLATE HAVING COLOR FILTER

BACKGROUND OF THE INVENTION

1. Field of the Invention

The present invention relates to a surface light source and a light guide plate used in the surface light source, and particularly to a surface light source and a light guide plate having a color filter.

2. Prior Art

In general, liquid crystal displays (LCDs) have two main advantages in comparison with cathode ray tubes (CRTs): LCDs are thin, and have low power consumption. It has been said that LCDs might one day completely replace CRT display devices, and LCDs have aroused great interest in many industries in recent times. In general, an LCD needs a surface light source to provide even light for a clear display.

FIG. 5 shows a conventional LCD 100, which comprises a liquid crystal panel 101 and a back light source 102 emitting light beams into the liquid crystal panel 101. The liquid crystal panel 101 has a first substrate 2, a Thin Film Transistor (TFT) substrate 7, and a liquid crystal layer 5 installed between the first substrate 2 and the TFT substrate 7. An top polarizer 1 and a bottom polarizer 8 are mounted on outsides of the first substrate 2 and the TFT substrate 7, respectively. A color filter 3 and a transparent electrode layer 4 are stacked on an inside of the first substrate 2 in that order from top to bottom. The transparent electrode layer 4 is made from Indium Tin Oxide (ITO). A TFT electrode 6 is disposed on the TFT substrate 7. The back light system 102 comprises a prism plate 9, a diffuser 10, a light guide plate 11, and a light source 12 emitting light beams into the light guide plate 11. The prism plate 9 and the diffuser 10 are stacked on the light guide plate 11 from top to bottom in that order. The light guide plate 11 changes directions of the incoming light beams, and transmits the light beams into the liquid crystal panel 101.

FIG. 6 shows the color filter 3 disposed on the first substrate 2. The color filter 3 comprises: a black matrix 14 formed on the first substrate 2 in a lattice pattern using a method such as photolithography; a color layer 13 filling and covering spaces defined in the black matrix 22 with color materials such as dyes, organic pigments or inorganic pigments, the color layer 13 being formed using photolithography; and a resin film layer 15 covering the color layer 13 and the black matrix 14. In the LCD 100, the color filter 3 is always disposed on the first substrate 2 of the LCD panel 101, and is an important element for realizing a high quality color display. However, the process for manufacturing the color filter 3 on the first substrate 2 is complex. Therefore, the cost of the first substrate 2 is correspondingly high.

A new light guide plate providing the function of color filtering is desired to overcome the above-described problems.

SUMMARY OF THE INVENTION

An object of the present invention is to provide a light guide plate having a color filter.

Another object of the present invention is to provide a back light system using a light guide plate having a color filter.

To achieve the above objects, a surface light source according to the present invention has a light source, and a light guide plate for transmitting light beams received from the light source. The light guide plate includes an incident surface for receiving the light beams; an emitting surface for uniformly transmitting light beams out; and a bottom surface opposite to the emitting surface for reflecting the light beams in directions toward the emitting surface. A color filter is disposed on the emitting surface of the light guide plate. The color filter has a color layer for a full color display.

Other objects, advantages and novel features of the invention will become more apparent from the following detailed description when taken in conjunction with the accompanying drawings, in which:

DETAILED DESCRIPTION OF THE PREFERRED EMBODIMENTS

Hereinafter, preferred embodiments of the present invention will be explained in detail with reference to the accompanying drawings.

Figure 1:
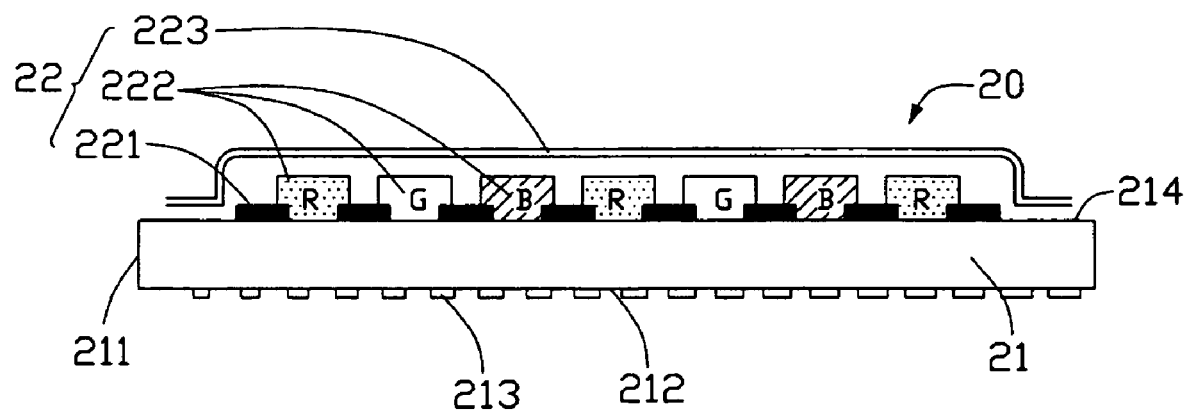
FIG. 1 is a schematic, side sectional view of a light guide plate in accordance with a first embodiment of the present invention.

Referring to FIG. 1, a light guide plate 20 in accordance with the first embodiment of the present invention comprises a substrate 21, and a color filter 22 disposed on and adjacent to the substrate 21. As shown, the substrate 21 may be generally rectangular or square. Alternatively, the substrate 21 may be wedge-shaped or have another suitable shape. The substrate 21 is made from a transparent glass or synthetic resin. Various kinds of highly transparent synthetic resin may be used, such as acrylic resin, polycarbonate resin, vinyl chloride resin, etc.

The substrate 21 defines a light incident surface 211, a light emitting surface 214 adjacent to the light incident surface 211, and a bottom surface 212 adjacent to the light incident surface 211 and opposite to the light emitting surface 214. A large number of scattering dots 213 are disposed on the bottom surface 212. The scattering dots 213 reflect and diffuse light beams in directions toward the light emitting surface 214 of the light guide plate 20. The scattering dots 213 are projections, whose sizes increase with increasing distance away from the light incident surface 211. In an alternative embodiment, the scattering dots 213 may be uniformly sized, with a density of distribution of the scattering dots 213 increasing exponentially with increasing distance away from the light incident surface 211.

Figure 2:
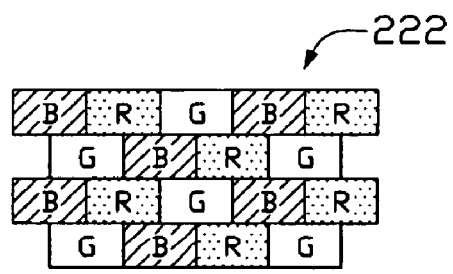
FIG. 2 is a top elevation of a color layer of a color filter of the light guide plate of FIG. 1.
Figure 3:
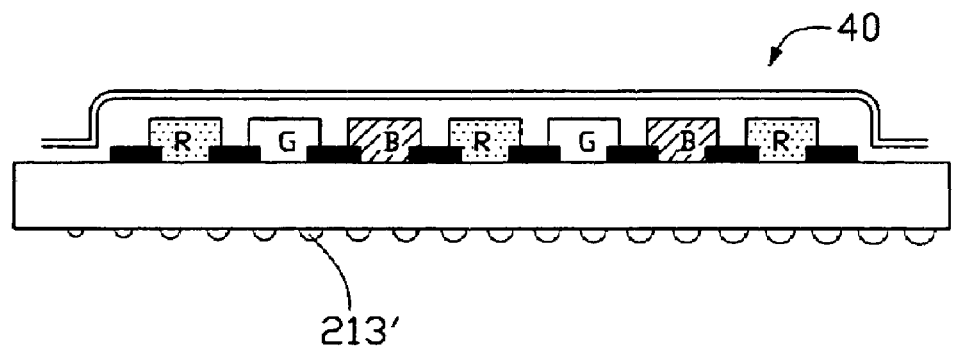
FIG. 3 is a schematic, side sectional view of a light guide plate in accordance with a second embodiment of the present invention.
Figure 4:
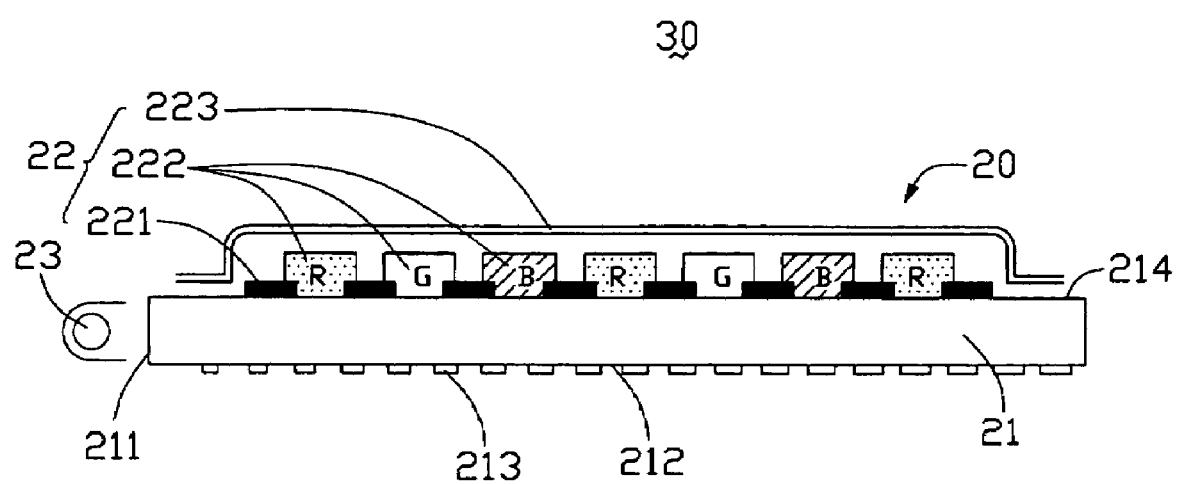
FIG. 4 is a schematic, side sectional view of a surface light source in accordance with the present invention.
Figure 5:
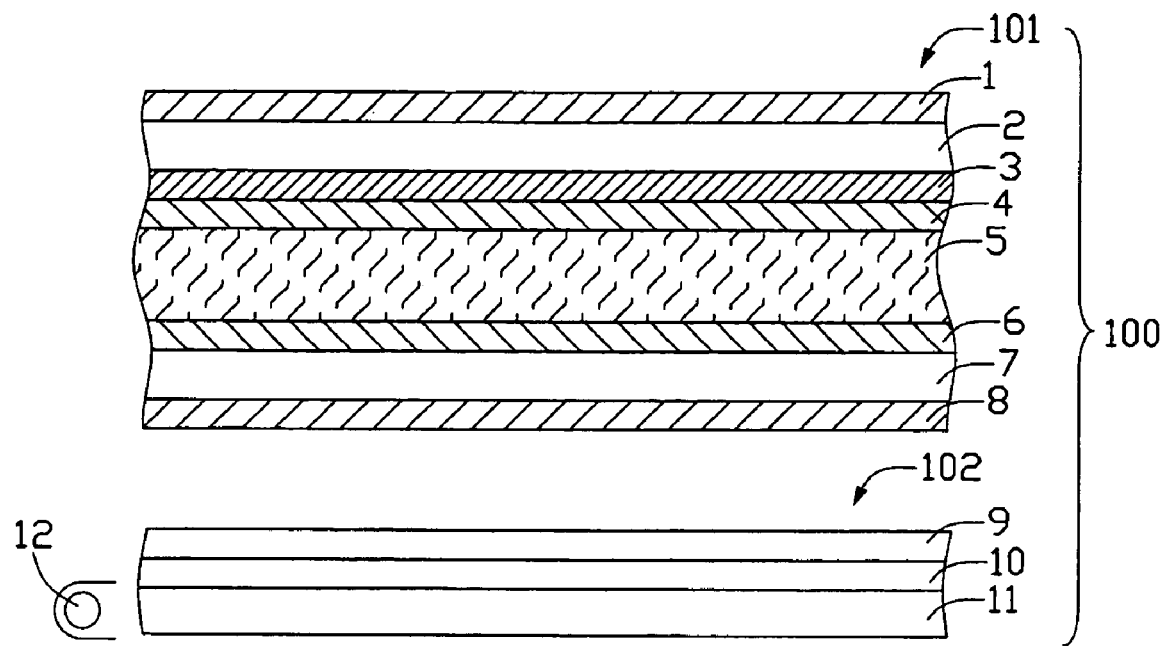
FIG. 5 is a schematic, side sectional view of part of a conventional liquid crystal display.
Figure 6:
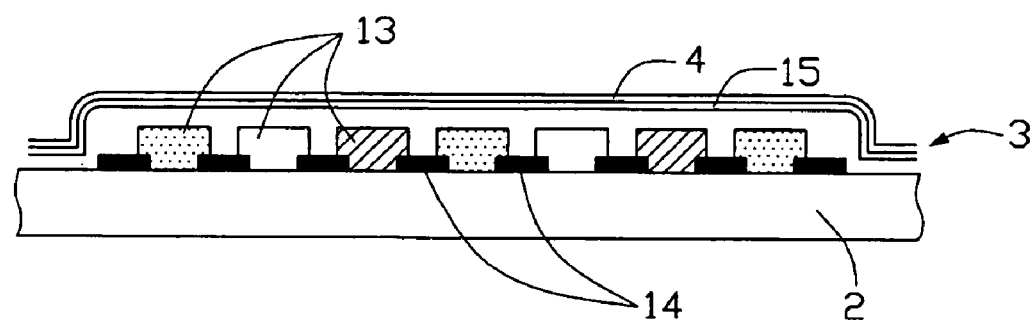
FIG. 6 is a schematic, enlarged, inverted view of a color filter of the liquid crystal display of FIG. 5.

The color filter 22 includes a black matrix 221 disposed on the light emitting surface 214 of the substrate 21 in a lattice pattern, a color layer 222 filling spaces defined in the black matrix 221, and a light shielding layer 223 covering and, as seen from FIGS. 2–4 generally on the color layer 222 and the black matrix 221.

The color layer 222 is printed into and covers the spaces in the black matrix 221 by using photolithography. A plurality of color filter elements of red (R), green (G) and blue (B) is thus formed in a predetermined pattern, such as the deltoid pattern shown in FIG. 2. Alternatively, the pattern may be a striped pattern or a mosaic pattern. In the deltoid pattern, the color filter elements in any row are displaced one and a half places relative to the color filter elements in each of the adjacent rows. In the striped pattern, each of columns of the pattern is a same color. In the mosaic pattern, the color filter elements are aligned in regular rows and columns. Any three consecutive color filter elements in any row have the colors R, G and B, and any three consecutive color filter elements in any column have the colors R, G and B. Generally, a deltoid pattern is preferable for medium and small sized LCD panels, and can provide LCD displays with natural looking color images. The color filter elements of R, G and B are made from color materials such as dyes, organic pigments or inorganic pigments, and have a thickness in the range from 1.0 to 3.0 μm. In the preferred embodiment, the color filter elements of R are made from anthraquinone, and the color filter elements of G and B are made from phthalocyanine.

The black matrix 221 is usually made from a metal chromium film or a resin material having a thickness in the range from 1.0 to 2.0 μm, by using a desired patterning technique such as photolithography. The black matrix 221 blocks light beams, and functions to cut down on reflections and improve the reproduction of black on the LCD display. The result is color that is more true to life and with enhanced contrast, thus providing an exceptional screen image.

The light shielding layer 223 is made from an epoxy resin film or a titanium dioxide film. Each of such films has shielding characteristics, to protect the light guide plate 20 from ultraviolet wavelength light beams originating from the external environment. That is, propagation of ultraviolet wavelength light beams to the color layer 222 is prevented by the provision of the light shielding layer 223. Direct decomposition of the color filter elements is restricted, and fading is prevented.

In operation, when light beams from a light source are introduced into the light guide plate 20 via the light incident surface 211, the light beams are reflected and diffused by the bottom surface 212 and scattering dots 213 in directions toward the light emitting surface 214. The color filter 22 is employed as an optical element for a full color display, with each three adjacent color filter elements of R, G and B constituting one pixel unit. Light beams are respectively passed through one of the R, G and B color filter elements contained in each pixel to achieve the full color display.

Referring to FIG. 3, a light guide plate 40 according to a second embodiment of the present invention is similar to the light guide plate 20 of the first embodiment. However, the light guide plate 40 comprises a large number of scattering dots 213' that are micro lenses.

FIG. 4 shows a surface light source 30 according to the present invention. The surface light source 30 utilizes the light guide plate 20 to introduce light beams from a light source 23 into a liquid crystal display (not shown). The light source 23 is a cold cathode fluorescent lamp (CCFL) or a light emitting diode (LED), and is disposed adjacent to the light incident surface 211 of the light guide plate 20. In an alternative embodiment, the light guide plate 20 may define two opposite light incident surfaces including the light incident surface 211. The surface light source 30 may comprise two light sources 23 disposed adjacent to the light incident surfaces of the light guide plate 20 respectively, for providing high luminance.

In summary, the light guide plates 20, 40 and the surface light source 30 provide the color filter 22 therein. An LCD panel employing the surface light source 30 does not have to provide its own color filter. This can simplify the manufacturing process of the LCD panel and reduce costs accordingly.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

We claim:

1. A light guide plate for introducing light beams from a light source into a liquid crystal display, comprising:
    an incident surface for introducing light beams into the light guide plate;
    an emitting surface for uniformly transmitting light beams out from the light guide plate;
    a bottom surface opposite to the emitting surface for reflecting the light beams in directions toward the emitting surface; and
    a color filter disposed on and adjacent to the emitting surface, the color filter comprising a color layer for a full color display and a light shielding film, the light shielding film covering the color layer, the light shielding film being configured for shielding ultraviolet wavelength light beams and for thereby preventing propagation of such ultraviolet wavelength light beams to the color layer.

2. The light guide plate of claim 1, wherein the color filter further comprises a black matrix having a lattice pattern.

3. The light guide plate of claim 1, wherein the color Layer is formed by a plurality of color filter elements of red (R), green (0), and blue (B) arranged in a predetermined pattern.

4. The light guide plate of claim 3, wherein the color filter elements fill spaces defined in the black matrix.

5. The light guide plate of claim 3, wherein the color filter elements are arranged in a deltoid pattern, a swiped pattern, or a mosaic pattern.

6. The light guide plate of claim 1, further comprising a plurality of scattering dots formed on the bottom surface, for reflecting and scattering light bean in directions toward the light emitting surface.

7. A surface light source comprising:
    a light source;
    a light guide plate for transniltting light beams received from the light source, comprising : an incident surface for receiving light beams; an emitting surface for transmitting the light beams; and a bottom surface opposite to the emitting surface for reflecting the light beams in a color filter disposed on and adjacent to the emitting surface of the light guide plate, the color filter comprising a color layer for a full color display and a light shielding film, the light shielding film covering the color layer, the light shielding film being configured for shielding the color layer from ultraviolet wavelength light beams and for thereby preventing propagation of such ultraviolet wavelength light beams to the color layer.

8. The surface light source of claim 7, wherein the color filter further comprises a black matrix having a lattice pattern.

9. The surface light source of claim 7, wherein the color layer is formed by a plurality of color filter elements of red (R), green (G), and blue (B) arranged in a predetermined pattern.

10. The surface light source of claim 9, wherein the color filter elements fill spaces defined by the black matrix.

11. The surface light source of claim 9, wherein the color filter elements are arranged in a deltoid pattern, a swiped pattern, or a mosaic pattern.

12. The surface light source of claim 7, wherein the light guide plate further comprises a plurality of scattering dots formed on the bottom surface for reflecting and scattering light beams toward the light emitting surface.

13. The surface light source of claim 7, wherein the light source is a cold cathode fluorescent lamp or a Light emitting diode.

14. A surface Light source system comprising:
a liquid crystal panel; and
a backlight source including:
a light source;
a light guide plate located beside said light source and defining an incident surface for receiving light beams, an emitting surface for transmitting the light beams; wherein
a color filter is disposed between the back light source and the liquid crystal panel, the color filter being adjacent to the emitting surface of said light guide plate, the color filter comprising a color layer for a full color display and a light shielding film, the light shielding film covering the color layer, the light shielding film being configured for shielding the color layer from ultraviolet wavelength light beams and for thereby preventing propagation of such ultraviolet wavelength light beams to the color layer.

15. The surface light source system of claim 14, wherein said light guide plate further includes a bottom surface for reflecting the light beams toward the emitting surface.

16. The surface light source system of claim 15, wherein the light guide plate further comprises a plurality of scattering dots formed on the bottom surface for reflecting and scattering light beams toward the emitting surface.

17. The surface light source system of claim 15, wherein sizes of the scattering dots increase with increasing distance away from the light incident surface.

18. The surface light source system of claim 15, wherein a density of distribution of the scattering dots increase exponentially with increasing distance away from the light incident surface.

* * * * *